United States Patent [19]

Wayman et al.

[11] Patent Number: 4,674,914

[45] Date of Patent: Jun. 23, 1987

[54] REPLACING MAINS

[75] Inventors: Malcolm Wayman, Newcastle-upon-Tyne; Geoffrey I. Mood, Whiteley Bay, both of England

[73] Assignee: British Gas Corporation, England

[21] Appl. No.: 691,125

[22] Filed: Jan. 14, 1985

[30] Foreign Application Priority Data

Jan. 19, 1984 [GB] United Kingdom ............... 8401452

[51] Int. Cl.⁴ ............................................. F16L 55/18
[52] U.S. Cl. ................................... 405/154; 30/92.5; 138/97; 254/29 R; 15/104.07; 15/104.08
[58] Field of Search .................. 405/154, 156; 138/97; 254/134.3 FT, 29 R; 175/230, 94, 98, 97; 166/55.2, 55.3; 30/92.5; 83/178

[56] References Cited

U.S. PATENT DOCUMENTS

| | | | |
|---|---|---|---|
| 1,668,034 | 5/1928 | Zaluski | 175/98 |
| 2,877,822 | 3/1959 | Buck | 175/98 X |
| 2,951,681 | 9/1960 | Degen | |
| 3,181,302 | 5/1965 | Lindsay | 405/156 |
| 3,185,225 | 5/1965 | Ginies | |
| 3,354,969 | 11/1967 | Ebeling | |
| 3,550,389 | 12/1970 | Khodosh et al. | 405/142 |
| 3,602,263 | 8/1971 | Bremner | 405/154 X |
| 3,827,512 | 6/1974 | Edmond | 175/94 |
| 3,926,267 | 12/1975 | Konstantinovich | |
| 4,309,128 | 1/1982 | Williams | 405/154 |
| 4,314,615 | 2/1982 | Sodder et al. | 175/94 |
| 4,457,647 | 7/1984 | Dusette et al. | 405/154 |
| 4,487,052 | 12/1984 | Yarnell | 254/134.3 FT |
| 4,505,302 | 3/1985 | Streatfield et al. | 405/156 X |
| 4,507,019 | 3/1985 | Thompson | 405/154 |

FOREIGN PATENT DOCUMENTS

| | | |
|---|---|---|
| 086567 | 9/1986 | European Pat. Off. |
| 2138532 | 10/1984 | United Kingdom |
| 2137720 | 10/1984 | United Kingdom |
| 2137719 | 10/1984 | United Kingdom |

*Primary Examiner*—Dennis L. Taylor
*Attorney, Agent, or Firm*—Larson and Taylor

[57] ABSTRACT

The invention relates to a self-propelled apparatus 1 for replacing main such as a gas main 2, comprising a single double acting hydraulic piston and cylinder combination 3 connected with slidable devices 4, 6 operable by the device for step-by-step movement of the apparatus through the main on alternate strokes of the combination, the devices 4 and 6 being operative in only a forward direction to slide to grip the main, the apparatus drawing a vibratable breaker device 20 (FIG. 2) or 30 (FIG. 3) through the main, the device being vibratable to precess about an axis and the device 30 being vibratable by percussive means longitudinally of the main.

10 Claims, 15 Drawing Figures

REPLACING MAINS

The invention relates to the replacement or the preparation for replacement of an existing main, conduit, pipe or the like, hereinafter referred to as a "main", particularly an existing cast iron gas main.

Mains often have to be replaced for one or more of several reasons, for example the existing main may be deteriorating so that it is in poor condition and liable to failure, or the existing main may not be of sufficient capacity to accommodate a new load.

Usually it is necessary to replace an existing main by using labour which is both costly and time-consuming, particularly if total excavation of the ground is necessary. On the other hand, if a new main is merely inserted in an existing main, it will necessarily have a smaller internal diameter than the existing main and will thus be of smaller gas carrying capacity.

It is accordingly an object of the invention to seek to mitigate the disadvantages of the prior art.

According to the present invention there is provided apparatus for self-propelled passage through a main for breaking same in situ, comprising a traction unit having means operable to draw the apparatus through the main is a step-type action, and a breaker device connected with the traction unit to the rear thereof in use for breaking the main as the apparatus passes through the main.

More specifically, the present invention relates to an apparatus for self-propelled passage through a main for breaking the same, in situ, which includes a traction unit which draws the apparatus through the main in a step-type action and a breaker device connected to the rear thereof to break the main as the apparatus passses therethrough. The traction unit has a double-acting piston and cylinder combination and a device carried by this combination such that on successive strokes of the combination the device respectively slides along or grips the interior surface of the main in the step-type action to progressively move the apparatus thorugh the main. This device has a first member connected with the piston and cylinder combination and a second member slidably mounted on the device for movement transverse to the longitudinal axis of the combination. The first and second members have surfaces in mutual sliding engagement, which surfaces are inclined to the longitudinal axis and slide relatively in response to a stroke of the combination to produce the transverse movement. The device also includes structure for biasing the device towards a condition in which the device grips the interior surface of the main.

Apparatus embodying the invention is hereinafter described, by way of example, with reference to the accompanying drawings.

Figure 1A:
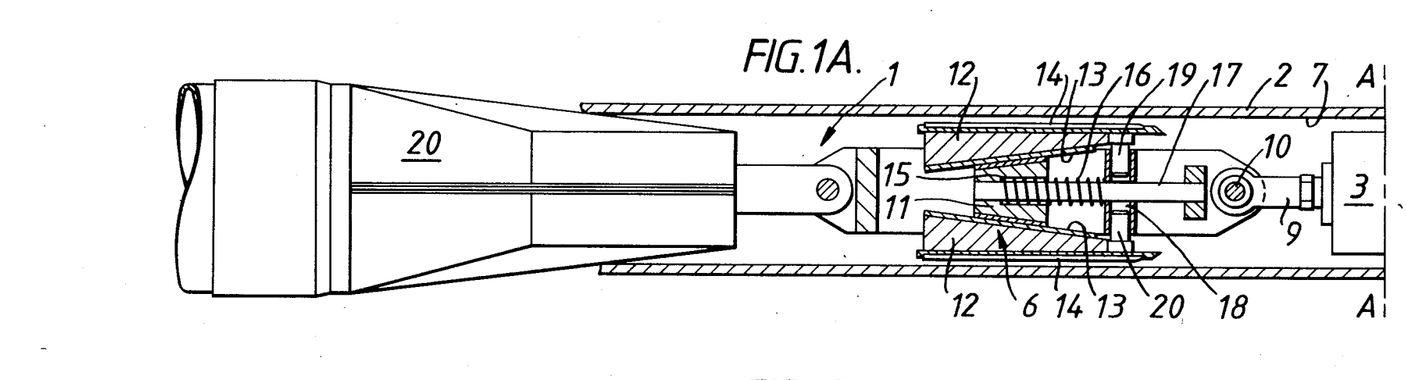
FIGS. 1A and 1B show respective sections through a main with apparatus for self-propelled passage along the interior of the main and a breaker device, FIGS. 1A and 1B showing part of the same main which is split at line A—A for clarity.
Figure 1B:
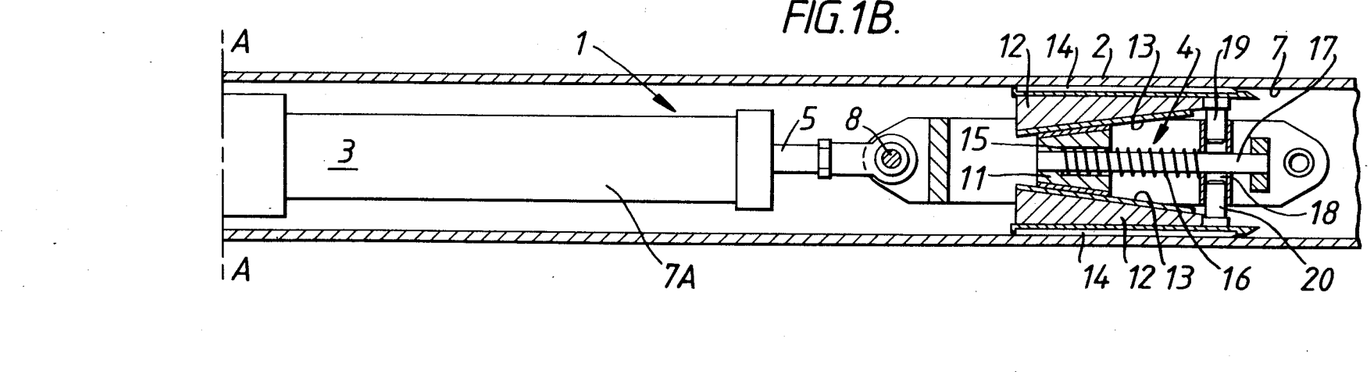

Referring firstly to FIGS. 1A and 1B, the apparatus 1 shown therein is for passage along the interior of a main 2, comprising a single double-acting piston and cylinder combination 3 and a device 4 carried by the piston 5 of the combination 3 and a device 6 carried by the cylinder 7A of the combination so that the device 4 leads and the device 6 trails, the devices 4 and 6 being operable by the combination 3 so that on alternate strokes thereof the devices 4 and 6 slide alternately to engage and disengage from the interior surface 7 of the main 2 whereby progressively to move the apparatus 1 through the main.

The device 4 is connected by an articulated joint 8 to the free end of the piston 5 and the device 6 is connected by a fixed shaft 9 and articulated joint 10 to the cylinder 7A. Both devices 4 and 6 comprise a first member in the form of a truncated-pyramid forming a wedge 11 which has an outer surface which tapers towards the longitudinal axis of the combination 3, that is from right to left as viewed in FIGS. 1A and 1B. Both devices 4 and 6 also comprise a second member in the form of a pair of part circular members or feet 12 made of steel and each having a tapered surface 13 in sliding engagement with the surface of the wedge 11. The feet 12 are on opposite sides of the longitudinal axis as viewed and each has a gripping means in the form of a polyurethane pad 14 for gripping the interior surface 7 of the main 2.

Each wedge 11 has a central blind well or recess 15 in which is seated biassing means in the form of a compression spring 16 mounted round a rod 17 and butting at the end remote from the wedge 11 against an abutment including a transverse bore 18 providing sockets for respective spigots 19 and 20 of the feet 12 which spigots 19 and 20 and sockets 18 mount the feet 12 for radial sliding movement. The spring 16 effectively works between the wedge 11 and feet 12 whereby to tend to urge the feet 12 and thus the pads 14 into contact with the interior surface 7 of the wall of the main 2. However, the wedge 11 of each device 4 and 6 is otherwise free to slide relative to the feet 12.

In use, the feet 12 can slide along the main 2 in a forward direction only. Any loading of the feet 12 in the reverse direction by rearward movement of the wedges 11 locks the feet 12 against the wall 7 of the main 2 to prevent further movement. Therefore as the combination extends on a forward stroke to the right as viewed the rear feet 12 lock to prevent any reverse movement while the front feet 12 slide forward. Alternate movement of this kind causes the apparatus 1 to "walk" through the main 2 and to tow anything attached to its rear end such as a breaker device 20. In each case rearward (to the left) movement of the wedges 11 causes the feet 12 to slide radially outwards to grip the main 2, the spigots 19 sliding freely in the sockets 18 to accomplish this.

The apparatus 1 could be used to tow through a main any suitable article such as a new main, a cable, etc and indeed any kind of device which would break open a main and replace it with a new one (not just the devices described).

Furthermore the rear device 6 can be eliminated where the apparatus 1 is used to break open a main 2 in combination with a breaking device. In the apparatus 1 the rear device 6 provides the necessary resistance to backwards movement during a forward stroke of the cylinder 7A. It would not be eliminated where the combination 3 is being used to tow light equipment through the main. However during mains replacement the breaker device 20 itself will provide sufficient resistance to rearward movement because it will be securely trapped in the main 2. Alternatively it may be possible to provide resistance to rearward movement by applying a restraining force in a launch pit from where the apparatus and breaker device are launched. This could be done for example using a ratcheted roller assembly. The resulting reduction in the overall length of the system would be beneficial.

Figure 2:
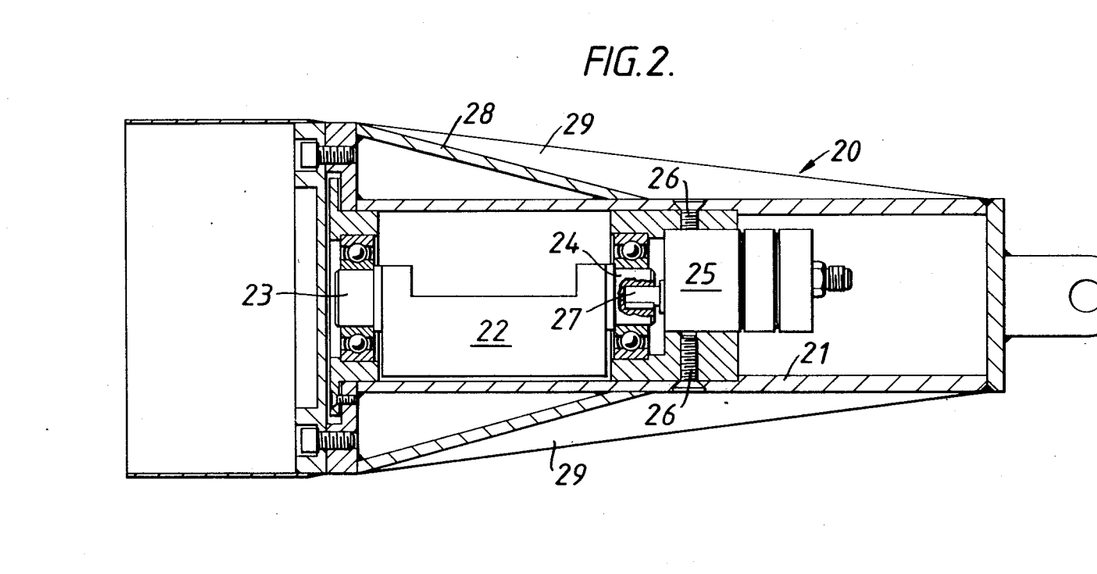
FIG. 2 to a larger scale than FIGS. 1A and 1B, one embodiment of vibratable breaker device in longitudinal cross-section.

Referring now to FIG. 2, there is shown a breaker device like the device 20 shown in FIGS. 1A and 1B.

The device 20 comprises a tubular body 21 housing a weight 22 which is eccentrically mounted and is rotatable on stub shafts or axles 23 and 24 by means of a motor 25 also housed in the body, by means of screws 26. A driving shaft 27 of the motor 25 is in driving engagement with the axle 24. The rear of the body 21 is enclosed by a frusto-conical outer steel shell 28, the body and shell being secured by screws. Also secured between the body 21 and the shell 28 are four steel blades 29 to cut the main.

In use as the breaker device is towed through the main by the apparatus 1 which comprises a traction unit, the weight 22 is rotated on its axis and causes the conical section 28 to precess about its axis. This takes the form of a vibration which assists the device 20 in displacing outwardly any material broken up or loosened by the device 20 as it is towed forward.

The device 20 could be attached to a winch cable and be winched forward instead of being towed forward by means of the traction device 1. An extremely powerful winch would be necessary in this case.

Figure 3:
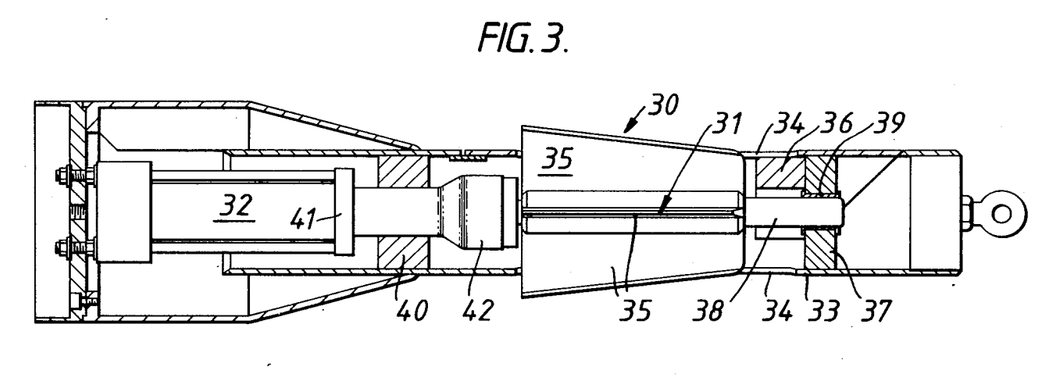
FIG. 3 shows to a larger scale than FIG. 2 a second embodiment of vibratable breaker device in part longitudinal section.
Figure 4:
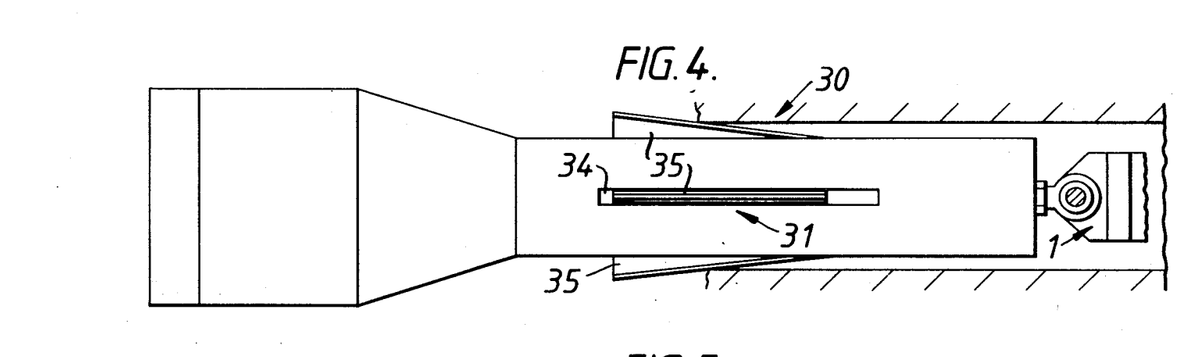
FIG. 4 shows the device of FIG. 3 in situ in a main in side elevation.

Referring now to FIGS. 3 and 4, there is shown an alternative breaker device 30 comprising a percussive breaker device, comprising a breaking head 31 which is actuated by an hydraulic ram 32. The head 31 is housed in a cylindrical casing 33 in which there are slots 34 through which extend four steel breaker blades 35 which are short enough for the blades to be reciprocable within the slots 34.

In use the head 31 impacts against a resilient pad 36 held against an annular bush 37 so that the head 31 rebounds backwards after a forward stroke. The head 31 has a guide pin 38 which slides within a bearing 39 in the bush 37. As with the conical breaker device 20, the percussive breaker device 30 is towed forward by the traction unit 1. A piston (not shown) within body 32 impacts the head 31, the body 32 being mounted within an annular mounting 40.

Figure 5:
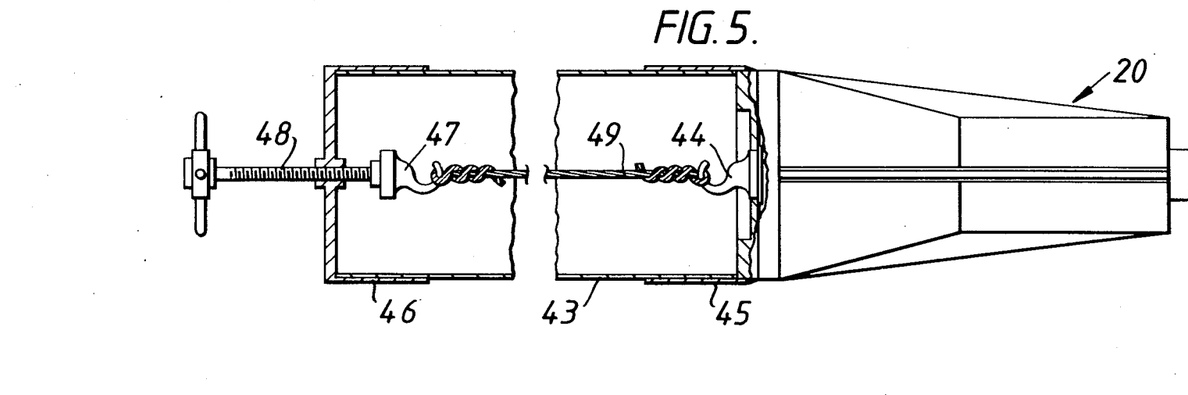
FIG. 5 shows a connection of a breaker device in this case like that of FIG. 2, with a new main and/or liner.

Either main breaker device 20 or 30 can be secured to a new main and/or liner 43, as shown in FIG. 5 which shows a breaker unit 20 including attachment means for the new main/or liner 43. The attachment means comprise a rearwardly extending connector in the form of a hook element 44 and clamping means in the form of a cylindrical cup 45, there being a similar, facing clamping cylindrical cup 46 at the rear end of the new main or liner 43. A rotatable hook element 47 is mounted in the cup 46 by a threaded shaft 48 and a torsional element in the form of a cable 49 is connected between the hook elements 44 and 47. By rotating the shaft 48 the new main or liner 43 is clamped tightly between the two clamping cups 45 and 46 and may then be drawn through the main being broken by the breaker device 20.

Figure 6:
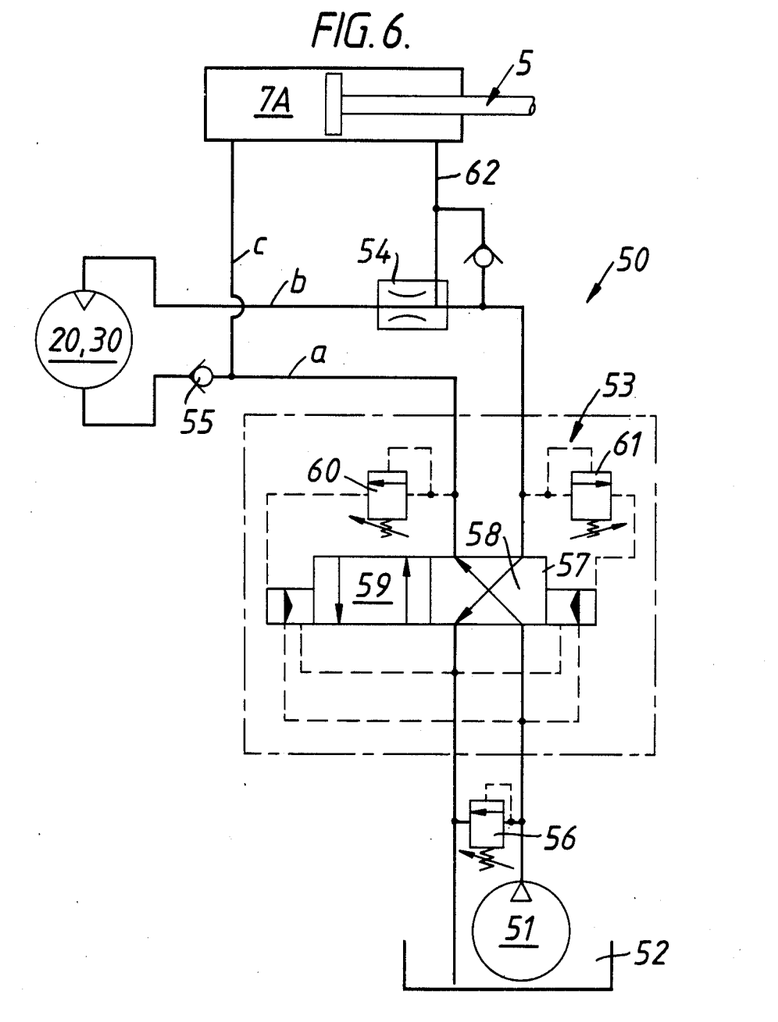
FIG. 6 shows a hydraulic circuit for use with apparatus according to the invention.

The apparatus 1, that is the combination 3 and the breaker device such as 20 or 30 is hydraulically operated. A suitable circuit 50 is shown in FIG. 6. Referring to FIG. 6 the hydraulic circuit 50 shown provides automatic cycling of the piston/cylinder combination 3 in the apparatus 1 and also provides activation of the mains breaking device, 20 or 30. This activation is limited to the contracting stroke of the combination 3 and only when the combination 3 has applied a certain predetermined minimum force to the breaker device.

The hydraulic circuit 50 includes a pump 51 and a fluid reservoir 52, a spool valve assembly 53, a priority flow divider 54, a non-return valve 55 and a terminal in the breaker device 20 or 30.

The spool valve 53 includes a reversing valve 57 for reversing fluid flow between lines a and b of the circuit 50. The valve 57 moves between positions 58 and 59 to reverse flow. The spool valve 53 also includes two actuating valves 60 and 61, valve 60 causing the valve 57 to change from position 58 to position 59 and valve 61 causing valve 57 to change back from position 59 to position 58. A further actuating valve 56 short circuits the flow when the fluid pressure exceeds 3000 psi. The valve 60 is actuated at 2800 psi and valve 61 is actuated at 2700 psi. These pressures can be varied to suit requirements.

When the valve 57 is in position 58, the fluid flows via lines a and c into the cylinder 7 but not into the breaker 20, 30. In this case the cylinder 7 and the piston 5 are actuated to expand so that the front feet 12 are moved forward while the breaker device 20, 30 is stationary and not actuated.

When the valve 57 is in position 59, fluid flows into the priority flow divider 54 which directs the required flow into the breaker 20, 30 thus actuating the breaker 20, 30. The remaining fluid enters the cylinder 7A via line 62. This causes the piston 5 and cylinder 7A to contract. Thus the breaker device 20, 30 is pulled forward.

Figure 7:
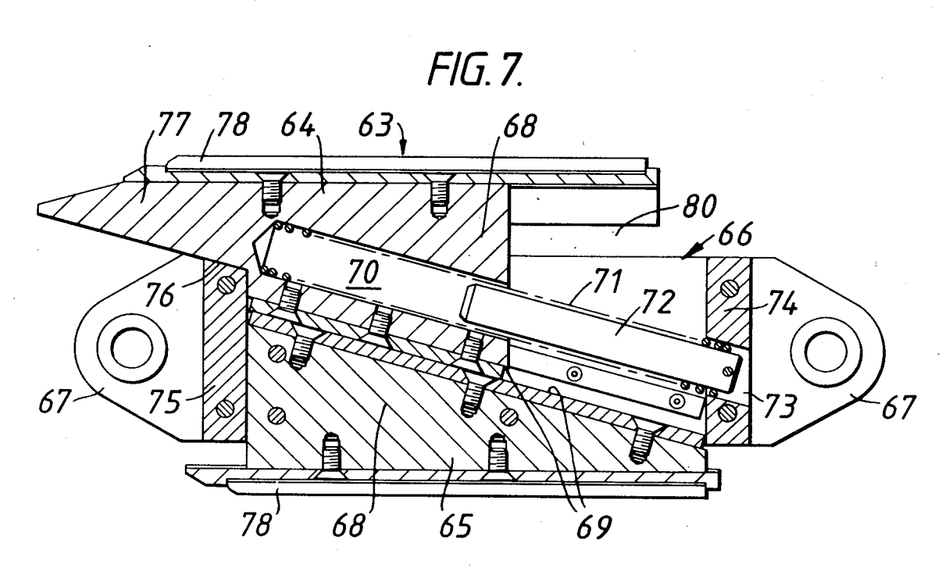
FIGS. 7 and 7A known to a larger scale than the other Figs. respectively a longitudinal cross-sectional view and an end view partly in transverse section of a device for drawing the apparatus through the main.
Figure 7A:
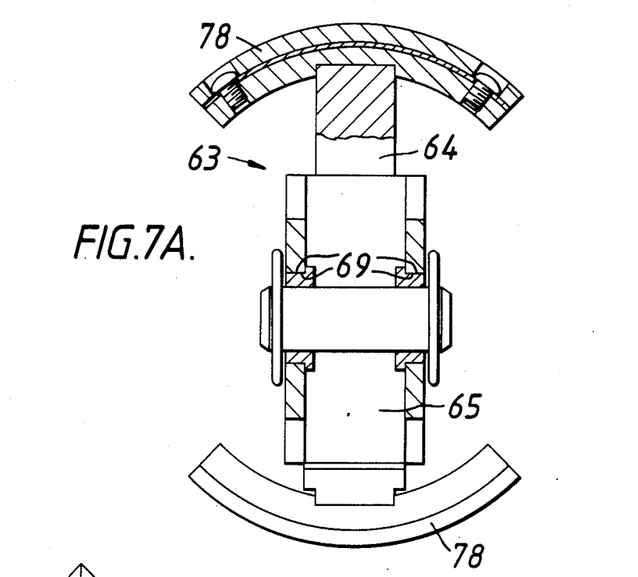

The apparatus shown in FIGS. 1 to 6 may be modified. For example, a device 63 for drawing the apparatus through the main may comprise two halves 64 and 65, as shown in FIGS. 7 and 7A. The device 63 has a body 66 with shackles 67 at each end for connection with the piston or cylinder, the two halves 64 and 65 being of curved profile for engaging the interior surface of the main, the halves 64 and 65 each having a support 68 each with an inclined surface 69 the surfaces 69 being in sliding contact, one of the bodies having a blind bore 70 in which is mounted a compression spring 71 which is also engaged around a guide pin 72 mounted in a bore 73 in an end wall 74 of the body 66 in which bore 73, the end of the spring 71 remote from the end in the body is received. An end wall 75 opposite the wall 74 has an inclined surface 76 which acts as a guide for a nose 77 of the support 68 which projects out of the body 66 when the device is actuated so that the halves 64 and 65 slide relative to each other, being held in contact with the interior surface of the main by the compression spring, each half having a gripping means in the form of a polyurethane pad 78 in frictional contact with the main.

The gripping means 78 and spring 71 maintain the device 63 in engagement with the main; in order to move device 63 along the main it is merely necessary to apply sufficient longitudinal force to overcome frictional resistance and so that the device "contracts" by the halves 64 and 65 sliding over one another along their respective mutually inclined and contacting surfaces 69 so that the upper (as viewed) half 64 is moved against the action of the spring 71 into the space 80 of the body 66, thereby effectively reducing the diameter of the device 63 for movement along the main. When the longitudinal or axial force is released the spring 71 slides the halves 64 and 65 apart and into frictional engagement with the main again, for drawing the whole apparatus through the main in step wise fashion as described hereinbefore with reference to FIGS. 1 to 7A.

Figure 8A:
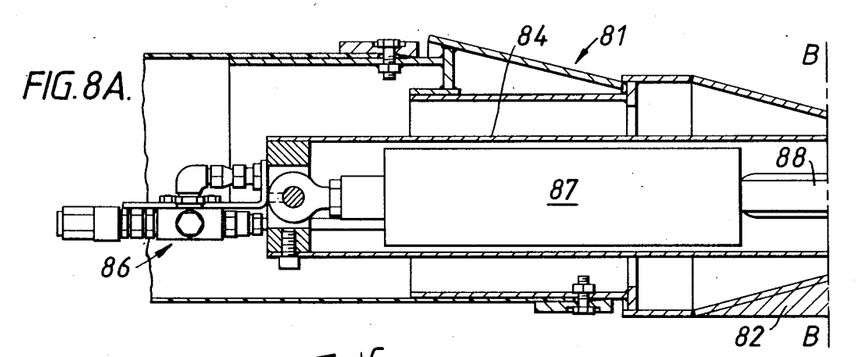
FIGS. 8A and 8B which are shown to a larger scale than FIGS. 1A to 6 and are split at line B—B respectively show a longitudinal sectional view of a further embodiment of a breaker device.
Figure 8B:
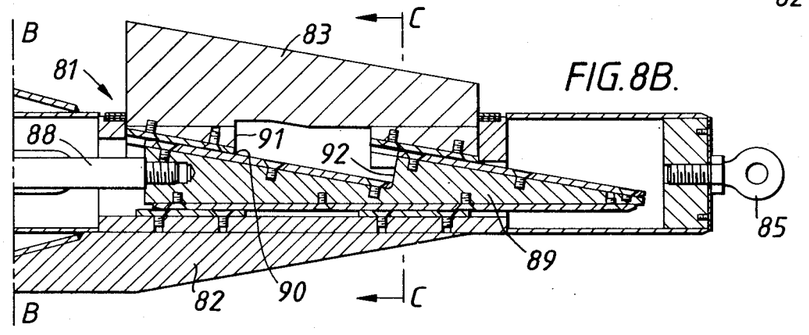
Figure 8C:
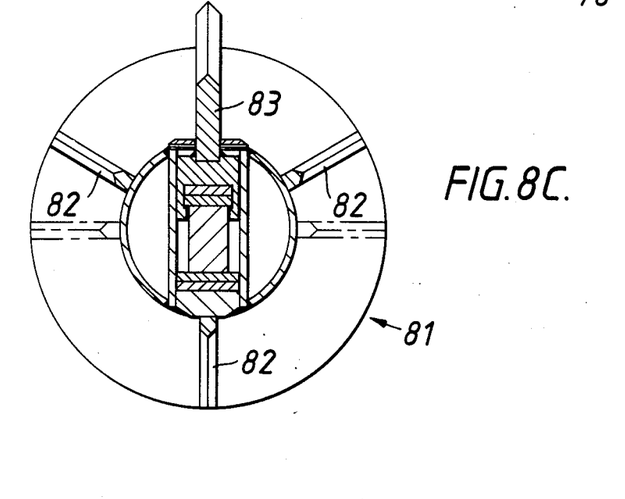
FIG. 8C is a transverse sectional view along lines C—C of FIG. 8B, FIGS. 9 and 10 show respective schematic perspective and longitudinal sectional views of a yet further embodiment of the breaker device.

Referring now to FIGS. 8A, 8B and 8C there is shown a modified breaker device 81 which has three fixed blades 82 and a movable blade 83.

Essentially the breaker device 81 has a substantially cylindrical body 84 having at one end a towing eye 85 and at the other hydraulic connection means 86 which is connected to a hydraulic ram arrangement 87 within the body 84, the end 88 of the ram 87 remote from the hydraulic connection 86 being secured to a wedge shaped operating means 89 for the movable blade 83 which has an inclined surface 90 complementary to the wedge. In the position shown the movable blade 83 is fully extended, the wedge 89 having been moved to the right as viewed to drive the movable blade 83 out of the body 84 of the breaker device. The complementary surfaces of the blade and wedge are stepped as shown so that on retraction of the wedge (to the left as viewed, FIG. 8B) the blade 83 effectively slides over the wedge until stop surfaces 91 and 92 abut, so that the blade 83 is effectively withdrawn into the device until it is ready to be extended again on actuation of the ram arrangement under hydraulic pressure.

The fixed blades 82 may be orientated as shown in full lines (Fig. 8B).

Figure 9:
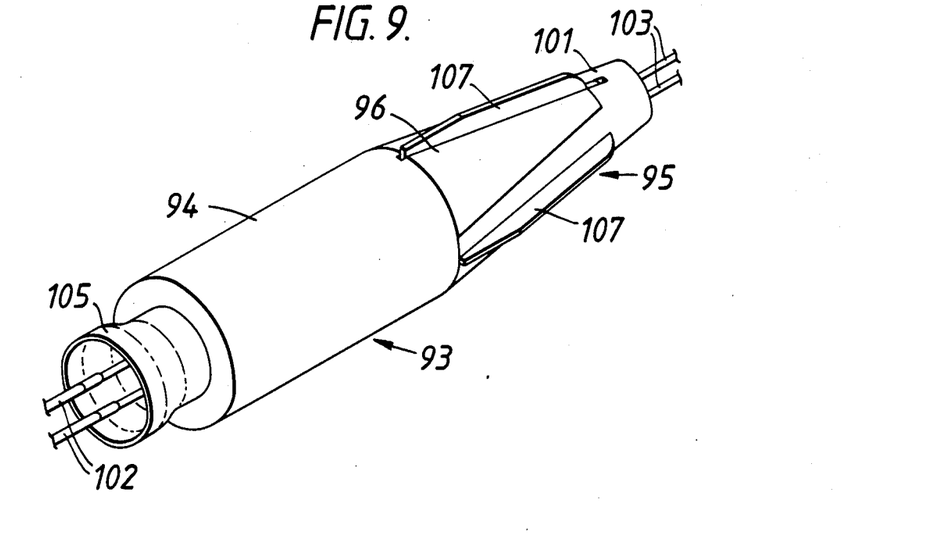
Figure 10:
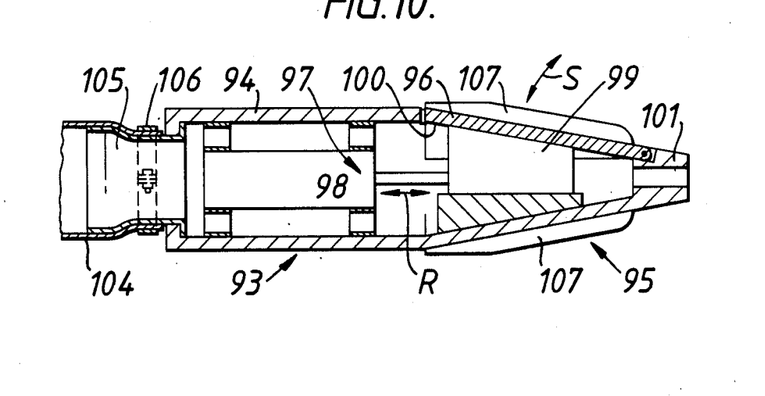

FIGS. 9 and 10 show another embodiment of breaking device or burster 93. This device 93, has been developed for particular applications for instance where a main to be burst is laid in particularly hard ground or cohesive clay. The device 93 is particularly suitable for such application and comprises a generally cylindrical body 94 having at its forward end a section 95 which is round at the rear (to the left as viewed) and oval at forward (to the right as viewed) end. The upper part 96 (as viewed) of the forward section 95 can be moved radially outwardly (about 18 mm in the embodiment shown) by a reciprocable hydraulic cylinder and ram arrangement 97, the ram 98 having a wedge 99 secured to it, which wedge 99 acts on a complementary inclined surface 100 of the upper part 96 so that as shown in FIG. 10 the upper part 96 can be extended outwardly when the wedge 99 moves to the right (as viewed) the forward end of the wedge being received in a housing 101 which prevents ingress of dirt, debris etc. from the ground or mains breaking operation. When the wedge 99, is retracted to the left, the upper part 96 of the forward section 95 automatically retracts under gravity to the Fig. 9 position.

The respective movements of the hydraulic cylinder and ram arrangement 97 and upper part 96 are shown by the double headed arrows R and S. The breaking device 93 has hydraulic supply lines 102 and hoses 103 to the traction unit, the lines 102 being protected by a sleeve 104 secured to a rear boss 105 of the device by a clamp 106.

Although a particular shape of forward section of the breaker unit has been described, other shapes such as conical are possible. In every embodiment the forward section 95 bears a plurality of longitudinally extending sharpened blades 107 on its outer surface, which assist in the ground and/or main breaking operation. This breaking operation is effective because the expansion of the upper part 96 provides a positive crushing force over a relatively large surface area.

Figure 11:
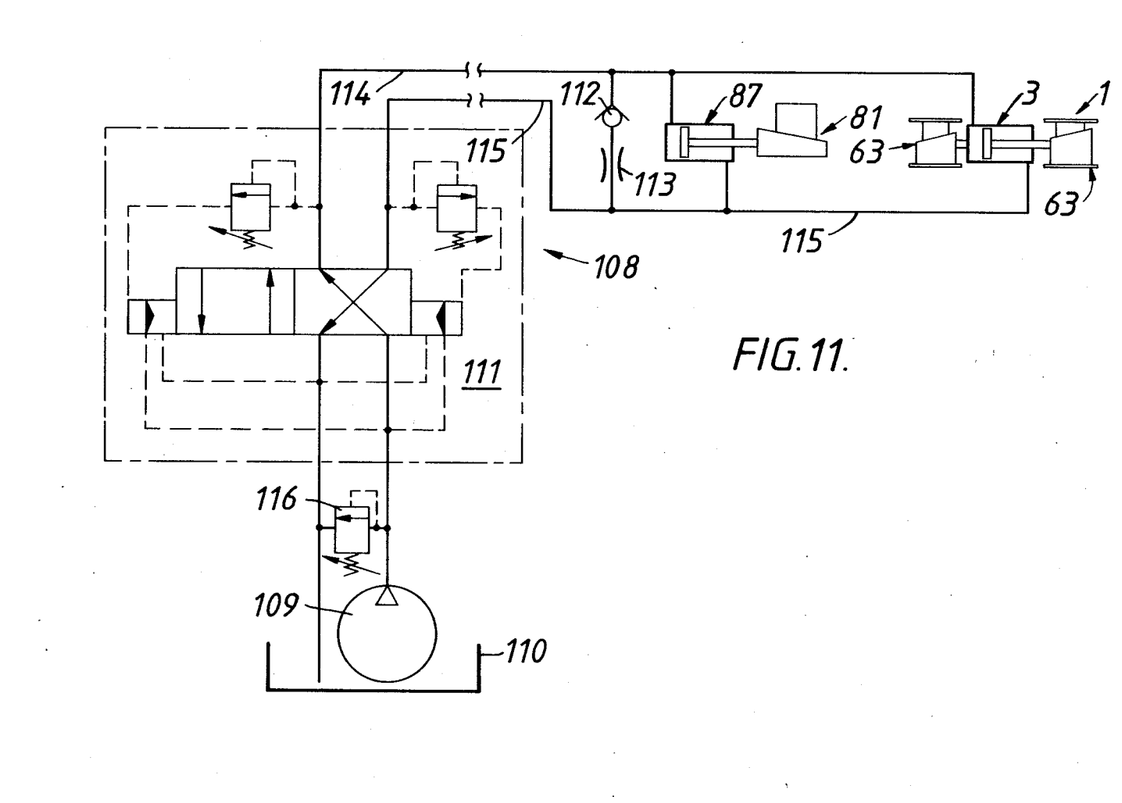
Fig. 11 shows schematically a further hydraulic circuit for operating modified apparatus including the drawing device and breaker device of FIGS. 7 and 8 respectively.

Referring now to FIG. 11, there is shown a hydraulic circuit 108 similar to that shown in FIG. 6, and which operates in a similar manner, the circuit being illustrated as acting on the drawing devices 63 of FIGS. 7 and 7A and movable blade breaking device 81 of FIGS. 8A, 8B and 8C, although it is equally applicable to the breaking device 93 shown in FIGS. 9 and 10. The circuit 108 includes a hydraulic pump 109, reservoir 110 for fluid, 4 way, 2 position spool valve 111 with integral pressure reversal, non-return valve 112 and flow restrictor 113 and lines 114 and 115 to the traction apparatus 63 and breaker device 81. There is also a main pressure relief valve 116 operating at 3000 psi, the spool valve 111 operating at 2700 psi. The non-return valve 112 and flow restricter 113 are in parallel with the traction apparatus 63 and breaker device 81 across lines 114 and 115, each line being fed to cylinders of respective piston and cylinder arrangements of drawing devices 63 and breaker device 81.

The operating sequence of the apparatus is as follows:

Line 114 is pressurised, causing the cylinder of the drawing device to extend, stroking the front device 63 forwards which requires a relatively low hydraulic pressure, only sufficient to overcome the friction of the pads 78 on the front halves 64 and 65 sliding on the main inside surface diameter. The breaker device cylinder does not extend at this stage since it is used to operate the movable blade against the main wall/fitting etc and therefore requires a much higher operating pressure. Once the traction cylinder reaches the fully extended position, the hydraulic pressure in line 114 increases, causing the breaker cylinder 81 to extend driving the movable blade 83 outwards breaking any pipe, fitting, etc.

This stroke continues until the breaker cylinder is fully extended. In this situation the pressure in line 114 quickly rises to a level sufficient to cause operation of the valve 111.

At this high pressure (around 2700 psi but adjustable) the valve switches thereby making line 115 the hydraulic pressure line and line 114 the hydraulic return line.

This reversal of pressure/return line causes the breaker cylinder to retract, to retract the movable blade 83 downwards. This requires a low hydraulic pressure and will continue until the breaker cylinder is fully retracted. The hydraulic pressure in line 115 now increases until it reaches a high enough level to cause the traction cylinder to retract, thus pulling the rear foot/breaker unit forward. This stroke also breaks and displaces any remaining large pieces of main etc, displaces the surrounding soil and pulls the sleeve forwards.

During operations in very wet ground conditions water and mud can flow forward into the main during the breaking operation causing the halves to slip. To prevent this a standard 6 inch pig cup may be fitted between the rear traction device and the front of the breaker device to act as a seal.

Although hydraulically operated systems have been described herein, it will be understood that any other suitable motive force such as electrical may be used. Also, the traction unit may be used with any of the breaker devices as desired.

We claim:

1. Appparatus for self-propelled passage through a main for breaking the same in situ, comprising a traction unit operable to draw the apparatus through the main in a step-type action, and a breaker device connected with the traction unit to the rear thereof for breaking the main as the apparatus passes therethrough, said traction unit comprising a double-acting piston and cylinder combination and a device carried by the combination and operable thereby so that on successive strokes of the combination the device respectively slides along or grips the interior surface of the main in said step-type action whereby progressively to move the apparatus through the main, said device comprising a first member connected with the combination and a second member slidably mounted on the device for movement transversely to the longitudinal axis of the combination, said first and second members having respective surfaces in mutual sliding engagement, which surfaces are inclined to said longitudinal axis and slide relatively in response to a stroke of the combination to produce said movement transverse to said longitudinal axis, said device further comprising biassing means urging said device towards a condition in which said device grips said interior surface.

2. Apparatus according to claim 1, in which said first member is a wedge having a first surface at one side thereof slidingly engaging said surface of said second member and having a second surface at an opposite side thereof slidingly engaging a corresponding surface of another second member, said second members both being slidably mounted on the device and arranged to slide along or to grip said interior surface.

3. Apparatus according to claim 1, in which said first and second members slide along or grip said interior surface.

4. Apparatus for self-propelled passage through a main for breaking same in situ, the apparatus comprising at least one assembly including a body and two feet engaging said main, a tool including a breaker device and double-acting hydraulic ram means positioned between and operatively connected to said body and to said tool, said assembly also comprising first and second surface means in mutual sliding engagement and inclined to the lengthwise direction of said main, said first and second surface means being connected, respectively, to said body and to at least one of said feet, said assembly also comprising a spring arranged between said body and said one of said feet, said spring causing wedge action of said first and second surfaces to force said feet against said main and to keep said surfaces in engagement, whereby a first stroke of said ram means applies force to said body in a first sense so as to reinforce said wedge action and said feet grip said main as said tool advances there along and whereby a second, succeeding stroke of said ram means applies force to said body in a second sense opposite to said first sense so as to reduce said wedge action, said feet then sliding along said main as said assembly advances therealong.

5. Apparatus according to claim 4, comprising a second assembly, which is similar to said one assembly and which is arranged between and connected to said ram means and said tool, said feet of said one assembly gripping said main while the feet of said second assembly slide therealong.

6. Apparatus according to claim 4 or claim 5, in which in said assembly or in each said assembly said two feet are both movable relatively to said body and said second surface means comprise oppositely inclined, opposing surfaces one on each of said feet and in which said assembly or each said assembly comprises a wedge connected to said body and interposed between said feet, said first surface means comprise two oppositely inclined faces which respectively engage said opposing surfaces on the feet.

7. Apparatus according to claim 4 or claim 5, in which in said assembly or in each said assembly a first one of said feet is connected to the body and a second one of said feet is movable relatively to the body and said first and second surface means comprise respectively a first surface on said first foot and a second surface on said second foot.

8. Apparatus according to claim 4 or claim 5, comprising hydraulic circuit means for operating said ram means, said circuit means being operable to operate said tool when a predetermined hydraulic pressure is reached in said circuit means.

9. Apparatus according to claim 8, in which said hydraulic circuit means comprise a pump, fluid reservoir, spool valve assembly including a reversing valve and a priority flow divider, said reversing valve having a first position in which fluid flows into a first end of said ram means to advance said one assembly along said passage, the fluid by-passing said flow-divider on its return path from said ram means and said reversing valve having a second position in which the fluid is divided by the flow divider into a first stream which flows into said breaker device for operation thereof and a second stream which flows into the other end of said ram means to advance said tool.

10. Apparatus according to claim 8, in which said hydraulic circuit means comprise a pump, fluid reservoir, spool valve assembly and a flow restrictor in series with a non-return valve, said ram means and said breaker device both being connected in parallel across said restrictor and non-return valve, said spool valve assembly having integral pressure reversal whereby once said ram means reaches the end of each said second stroke an initial rise in fluid pressure causes said breaker device to operate after which a further rise in fluid pressure causes said spool valve assembly to reverse its position to retract said breaker device.

* * * * *